Aug. 1, 1967  W. A. MOORE  3,334,010
HEAT-RESISTANT FIBROUS AMPHIBOLE ASBESTOS BOARD
CONTAINING AN INORGANIC BINDER
Filed Sept. 11, 1964
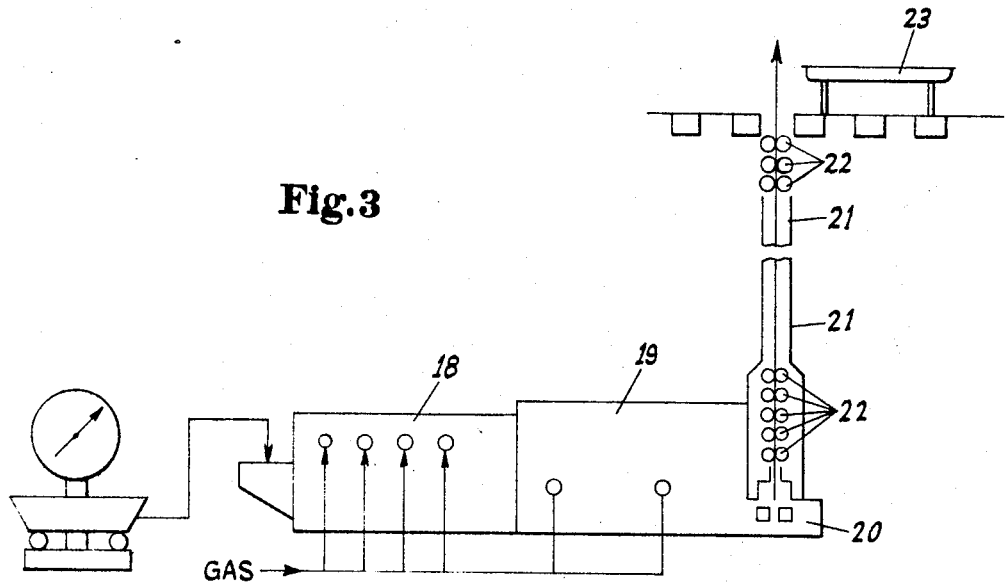
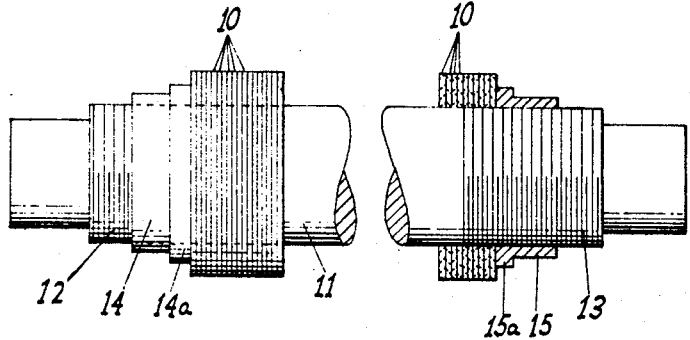
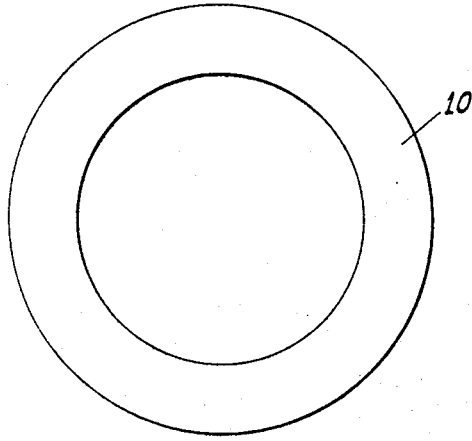
INVENTOR.
WILLIAM A. MOORE,
BY
ATTORNEYS.

United States Patent Office 3,334,010
Patented Aug. 1, 1967

3,334,010
HEAT-RESISTANT FIBROUS AMPHIBOLE ASBESTOS BOARD CONTAINING AN INORGANIC BINDER
William A. Moore, Elizabeth, N.J., assignor to The Philip Carey Manufacturing Company, Cincinnati, Ohio, a corporation of Ohio
Filed Sept. 11, 1964, Ser. No. 395,816
8 Claims. (Cl. 162—154)

This invention relates to an improvement in asbestos board, namely asbestos fibers formed and bonded together in sheet form. Such boards have been produced commercially for many years and usually are termed "asbestos millboard." They are produced in thicknesses ranging from about 1/16 inch to 1 inch and, depending on their thickness and the amount and kind of binder used, range from flexible to semi-rigid. Their composition is chiefly asbestos fiber, with a minor proportion of binder to bond the fibers together, and to impart strength and other desirable properties to the board. They are to be distinguished from the cement-asbestos board products, generally termed "asbestos-cement" boards, in which the asbestos fiber is a minor component of the composition and the properties of hardened "cured" Portland cement are predominant in the product. Except for its greater thickness, asbestos millboard more closely resemblies asbestos paper in composition and properties than it resembles asbestos-cement board.

As the binder for the asbestos fibers both organic and inorganic (mineral) binder materials have been used. The organic binder most commonly used is starch and the mineral binder has commonly been Portland cement. Starch is an effective binder for asbestos but has the serious drawback that it decomposes and carbonizes at temperatures above about 300° F., so that asbestos millboard containing it as a binder shrinks and loses strength when heated above that temperature, and must depend entirely on the rather weak natural bond of the asbestos fibers to hold it together when in service above that temperature. Hydrated, cured Portland cement is an effective binder for asbestos fibers at low temperatures, but begins to decompose and lose its water of hydration at a temperature of about 700° F. and is therefore less heat resistant than the chrysotile asbestos from which millboard usually is made.

In the manufacture of asbestos millboard, a water slurry is prepared containing the asbestos fiber and with the predetermined type and proportion of binder material uniformly dispersed therein. The slurry is supplied to a moving screen, rotating foraminous cylinder, felt carrier or other filtering surface through which a large part of the water is withdrawn, under partial vacuum, so that a thin wet-laid web of the asbestos fiber and binder solids is formed thereon. This wet-laid web may then be further dewatered by pressure or vacuum. As a single layer of the web is of insufficient thickness, the usual practice is to transfer the wet web to a cylinder or accumulator roll and wrap thereon a sufficient number of convolutions of the web to make the desired final thickness of the particular board product. Thus, a board of 1/4 inch thickness may consist of about 60–90 layers of the original wet-laid web. When the desired thickness has been built up, the wrapped, multiple-layer wet web is slit, stripped from the wrapping cylinder, and transferred to a flat support or stack for curing, pressing (if higher density is required), drying and any other processing that may be desired. When Portland cement is the binder for the fibers the wet board is usually allowed to cure at least 24 hours to permit the cement to hydrate and harden before the board is dried. The final moisture content of the dried board is usually about 5% by weight, or less.

It is apparent that the process of forming asbestos millboard is essentially a papermaking operation. Various modifications and special forms of paper machines and rotary filters are used and are so well known in the industry that they need not be described in detail. This type of asbestos board also may be produced readily and efficiently on a multi-cylinder machine of the type generally used for the production of cement-asbestos boards.

Fibrous asbestos sheets or boards of the "asbestos millboard" type have found numerous important uses. Their properties of non-combustibility, heat resistance, fire resistance, corrosion resistance, chemical stability, moderately good thermal insulation efficiency, and resistance to deteriorative attack by microbial life, such as bacteria or fungi, have enabled such boards to serve satisfactorily under many severe and unusual conditions. Thus, asbestos millboard is used extensively as a barrier to heat and fire when installed as a lining in the walls and doors of fire-resistant vaults and safe cabinets and fire doors in buildings. Its heat resistance and corrosion resistance have led to its large scale use in the fabrication of gaskets for internal combustion engines, as well as gaskets for many other types of equipment where service temperatures are high. Another use is as a heat resistant lining and thermal insulation in laboratory and commercial ovens. Asbestos millboard also serves as a heat shield and thermal insulation in many household appliances such as clothes dryers, electric grills, ovens, toasters, and broilers, etc.

An important special field of use for asbestos millboard is in the fabrication of asbestos rolls for the forming of sheet glass by the continuous drawing method as will be described more in detail hereinbelow. Special rolls fabricated of asbestos millboard have also been used successfully in the handling of stainless steel sheet through an annealing process, where temperatures may approach 2000° F. However, the service life of such rolls fabricated from chrysotile asbestos millboard has been relatively short, often only a few weeks or months, due to deterioration of the rolls resulting from their continuous exposure to high temperatures. As the replacement of such deteriorated rolls by new ones can only be effected during a complete shut down of the glass furnace, it is obvious that the economic cost to the sheet glass industry of the short life of these rolls is very high.

Generally, the object of this invention is to provide an asbestos millboard having physical properties and service capabilities much superior to those of asbestos millboards previously produced from the compositions of asbestos fiber and binders generally used in the manufacture of this product. Another object is to provide a composite binder for asbestos fibers that is completely inorganic (mineral) in character and inherently heat resistant, such that it enhances the heat resistance of the asbestos millboard product.

Another object of this invention is to provide compositions of asbestos fiber having special inherent properties, or combinations of different asbestos fibers, at least one of which has the desired special properties, such that the composite fiber mixture imparts to the asbestos millboard produced therefrom the requisite physical properties and service capabilities.

Among the objects of this invention is to provide an asbestos millboard having controlled properties of density, hardness, resistance to compression, flexural strength (modulus of rupture), mechanical stability, and resistance to shrinkage under heat exposure, that in combination afford high resistance to severe service conditions. Dimensional stability under prolonged severe heat exposure, as measured by loss of thickness on heating, is a particularly important characteristic of the asbestos millboard. Chrysotile asbestos millboard shows excessive heat shrinkage accompanying the loss of combined water which is believed to be a major cause of its short service life.

It is a special object of this invention to provide an asbestos millboard that has, in addition to controlled resistance to compression and low heat shrinkage, the property of resilience. By the term resilience is meant that property which enables the asbestos millboard to recover a substantial part of the reduction in thickness which results from compression of the board under a heavy load, after the load causing the compression has been removed. This property is considered important; and it is measured by the recovery from compression of an asbestos millboard that has been subjected to soaking heat at a high temperature before it is compressed. Retention of resilience after heating is a desirable characteristic of the improved asbestos millboard of this invention, and is one measure of its capability to endure prolonged exposure to high service temperatures.

Another special object of this invention is to provide a highly heat-resistant, resilient asbestos millboard that can be fabricated to form asbestos rolls, such rolls being capable of prolonged continuous exposure to freshly-formed sheet glass or sheet metal at surface contact temperatures as high as 1400° F. without appreciable deterioration, shrinkage or disintegration of the asbestos roll.

To achieve the improved high temperature service performance of the asbestos millboard of this invention, the reduction of heat shrinkage to a very low value is considered essential. The property of resilience, namely the ability to recover substantially from compression, after exposure to high temperature, is considered a desirable property although not so essential as low heat shrinkage. Whether or not this belief is correct the combination of these two properties is characteristic of the improved millboard, and differentiates it from previous asbestos millboards produced from chrysotile asbestos, which exhibit much higher heat shrinkage and poorer resilience after heat exposure, and which do not possess good service life under high temperature conditions.

The above stated objectives of this invention have been achieved by an asbestos fiber composition that includes a fiber of the amphibole group that is inherently tough and resilient, bonded into millboard form by a minor proportion of composite inorganic mineral binder. The two fibers which compose the above noted group are crocidolite and amosite; and while some of the objectives are achieved with the use of either crocidolite or amosite, and with the use of mixtures of the two in any proportion, at least about 30 percent of the total asbestos fiber should be in the form of crocidolite blue asbestos, and preferably the crocidolite should constitute at least about 50 percent of the total asbestos fiber content. The composite mineral binder includes a major proportion of a self-setting hydraulic cement such as Portland cement, modified by a smaller proportion of a highly plastic clay such as bentonite or other montmorillonitic clay. Both these binder materials are highly heat resistant, but the bentonite clay is more heat resistant than the cement at temperatures above 1000° F. Thus, the bentonite clay enhances the bond strength of the cement and modifies its hardness so that the asbestos millboard is stronger and less brittle in service at high temperatures than if Portland cement alone were used as the binder.

To illustrate one important use of the improved asbestos millboard of this invention reference is made to the drawings.

FIG. 1 is an elevational view of a typical asbestos disc die-cut from the asbestos millboard according to the present invention.

FIG. 2 is an elevational view with parts in section to to show the construction of an assembly of a multiplicity of the discs of FIG. 1 on a steel shaft; and In the Fourcault process, the lehr is vertical but in some processes it may be horizontal. In any event, in the lehr there may be thirty or more pairs of asbestos millboard rolls to guide the glass sheet, cool it and control its caliper during its upward travel. The melting furnace 18 provides molten glass for the drawing chamber 19. From this drawing chamber which is provided with a so-called debiteuse 20, the glass is drawn vertically by means of the drawing machine through the vertical lehr 21. Machines operating under the Fourcault process are well known and therefore will not be described in more detail than is necessary to an understanding of the use of the asbestos millboard of the present invention. The glass is drawn upwardly through the lehr by means of a metal bait lowered into the glass through a slot and the glass is continuously drawn upward in ribbon form as fast as it flows up through the slot and its surface is chilled by adjacent water coils. During its travel, the ribbon of hot glass is supported by means of the rollers 22 and when it emerges from the lehr it is cut into sheets of the desired size at the cutting table 23. In the past, these rolls have been asbestos covered and this is illustrated in FIGS. 1 and 2. Each of the lehr rolls consists of a plurality of perforated discs 10 of a board according to the present invention. The inside and outside diameters will depend upon the particular apparatus in question. The internal diameter is such that the discs 10 can be fitted over a shaft 11 as shown in FIG. 2. Generally, the discs 10 will be on the order of ¼ inch in thickness and a large number of such discs are assembled upon the steel shaft 11. The shaft 11 is provided with the threaded end portions at 12 and 13 and these threaded portions are engaged by the collars 14 and 15 having, respectively, the flanges 14a and 15a. The plurality of discs are consolidated and locked on a shaft to form a steel-reinforced solid asbestos millboard roll. In the lehr 21 of FIG. 3 there may be thirty or more pairs of asbestos millboard rolls.

As will be pointed out in more detail hereinafter, actual results with rolls made of asbestos millboard according to the present invention have been found to have a service life more than five times as great as rolls fabricated from heretofore known asbestos millboard.

Mineralogically, asbestos fibers fall in two classes—chrysotile (serpentine group) and amphibole (including crocidolite of the hornblende series and amosite of the Grunerite series). About four-fifths of the total world production of asbestos is chrysotile and virtually all of the asbestos produced in the United States and Canada is of the chrysotile type. Chrysotile asbestos and amphibole asbestos differ greatly in chemical constitution and in physical properties and while each may sometimes be used to make similar products they cannot be considered interchangeable or fully equivalent in certain important respects.

*Chrysotile asbestos.*—This type of asbestos is a hydrated basic magnesium silicate, represented by the general formula: $3MgO.2SiO_2.2H_2O$, and usually contains about 14 percent of water of crystallization (chemically combined water). The composition and properties vary somewhat in different deposits and small amounts of other minerals are usually present as impurities, including calcium, manganese, magnesium, aluminum and iron, some of which may occur in the actual fibrous crystals. The chrysotile asbestos fibers are usually rather flexible, soft and silky and often appear "curly" under microscopic examination. Due to their softness and flexibility they are not characterized by high resiliency after they have been compressed.

Chrysotile asbestos has a specific gravity in the range of 2.4 to 2.6. Its hardness (Mohs scale) ranges from 2.5 to 4.0, usually below 3.5, although asbestos from sq. in., somewhat greater than the tensile strength of cotton fiber, but well below that of carbon steel. The heat resistance of chrysotile asbestos is shown by the fact that after one hour exposure to 375° C. (707° F.) several fiber samples from different deposits retained from 64.2% to 88% of their original (unheated) strength. However, in another test at 1200° F. the chrysotile asbestos fiber lost 68% of its strength after only three minutes exposure to that temperature.

*Amphibole asbestos.*—This type of asbestos includes several fibrous hydrated silicates which are much more variable in composition than chrysotile asbestor. Three of these—anthophyllite, tremolite and actinolite—are of no value for the purposes of this invention because the fibers are generally weak and brittle so that their compositions and properties need not be detailed. The other two kinds of amphibole asbestor, crocidolite and amosite, are produced commercially in substantial quantities and various grades, and each has unique properties which distinguish it from chrysotile and make it effective for the purposes of this invention. Both are characterized by a very low content of water of crystallization, ranging from 1 to 3 percent compared with 14 percent for chrysotile. These fibers also have greater hardness, higher specific gravity, and greater stiffness and resilience than chrysotile asbestos.

Crocidolite or blue asbestos (produced in South Africa, Bolivia and Australia) is the fibrous form of the mineral Riebeckite, represented by the formula:

$$3Na_2O.6FeO.2Fe_2O_3.16SiO_2.H_2O$$

It is unique among asbestos fibers by reason of its very high tensile strength, ranging from 100,000 to 300,000 lb. per sq. in., approaching that of steel piano wire. The fibers are rather harsh and stiff and microscopic examination shows them to be straight and needle-like rather than flexible or "curly" like chrysotile. The hardness of crocidolite (Mohs scale) is about 4.0 and its specific gravity about 3.2. Crocidolite has greater chemical stability than chrysotile and is highly resistant to acids, many chemical solutions and sea water.

The heat resistance of crocidolite asbestos is good, but generally has been considered not equal to chrysotile in this respect. Thus, in the heat test at 375° C. (707° F.) the crocidolite lost 64.2% of its original strength after one hour of exposure. Crocidolite loses virtually all of its combined water at about 800° F. Thus, chrysotile has generally been considered superior for use under severe temperature conditions. Irrespective of such previous opinion and these heat test results, crocidolite asbestos has been found effective in the compositions of this invention to produce asbestos millboard of greatly improved heat resistance and possessing performance capabilities in service at high temperatures greatly exceeding those of asbestos millboard made with chrysotile asbestos.

Amosite asbestos (produced in South Africa) is a fibrous form of the monoclinic amphibole Grunerite and is a hydrated iron magnesium silicate containing also a small amount of alumina. In many of its properties it resembles crocidolite, particularly as to the harshness, stiffness and resilience of the fibers. Its hardness (Mohs scale) ranges from 5.5 to 6.0 and its specific gravity is about 3.2. However, amosite does not have the extremely high strength characteristic of crocidolite and its tensile strength usually does not exceed 90,000 lbs. per sq. in. Its chemical stability and resistance to acids and chemical solutions are similar to those of crocidolite.

The heat resistance of amosite asbestos is similar to that of crocidolite and while moderately high has generally been considered inferior to that of chrysotile based on the results of heat exposure tests in which loss of strength and loss of weight (combined water) have been used as measures of heat resistance.

Both crocidolite and amosite may correctly be described as tough and resilient asbestos fibers, in view of their physical characteristics. The term tough as used herein denotes the combination of properties—tensile strength, flexibility, resistance to fracture on bending, abrasion resistance, lack of brittleness—in other words, generally high ability to resist various mechanical stresses to which they may be subjected.

As illustrations of the improved products and service performance of asbestos millboard produced within the scope of this invention the following examples are presented.

EXAMPLE I

The following composition represents a preferred embodiment of this invention:

|  | Percent by Weight | Percent of Total Asbestos Fiber Content |
|---|---|---|
| Chrysotile Asbestos, Canadian 4K | 38.0 | 50 |
| Crocidolite, South African Blue | 38.0 | 50 |
| Bentonite Clay (Montmorillonitic) | 5.0 |  |
| Portland Cement, A.S.T.M. Type I | 19.0 |  |
|  | 100.0 |  |

The batch also may contain a small amount of refiberized asbestos millboard scrap having the same composition as the virgin material formula, which is not included in the above percentage figures.

The above formula was converted into ¼ inch thick asbestos millboard in a regular wet machine production operation, the wet sheets produced were allowed to cure for about 48 hours, these cured sheets were oven dried to less than 5 percent moisture content, and tested.

The test results on this millboard were as follows:

Density, unheated, lb. per cu. ft. _____ 55.7
Flexural strength (modulus of rupture) _____ 1115
Flexural strength, after heating 24 hours, at 1200° F. _____ 560
Heat shrinkage (caliper loss) after heating 24 hrs. at 1200° F., percent _____ 2.82
Recovery (resilience) after heating at 1200° F. and compressing under 1200 p.s.i., percent _____ 40.9

Discs were die cut from the asbestos millboard produced as above described and were fabricated into asbestos rolls for use in the drawing and cooling lehr of a continuous sheet glass production machine. This was done by placing the discs on a steel shaft, compressing or "locking" the discs in place by tightening threaded end thrust fittings, heat treating the assembled roll, re-tightening the discs and, finally, machining the roll surface to a smooth, true cylinder. The final assembled roll was, in effect, a steel reinforced asbestos millboard roll.

A complete set of these rolls, fabricated from the improved millboard of this invention was installed in the lehr of a commercial continuous sheet glass production furnace, as shown schematically in FIG. 3, replacing similar rolls previously used that were made from high grade chrysotile asbestos millboard. The improved asbestos millboard rolls were found to have a service life more than five times as great as that of the rolls fabricated from chrysotile asbestos millboard and during this entire period of operation showed no failure of the rolls by cracking, shrinkage or surface disintegration, no loosening of the discs on their shafts, and caused no surface blemishes or defects in the sheet glass produced. These rolls were in constant surface contact with the sheet glass at temperatures as high as 1200° F. and the lower rolls, nearest the molten glass reservoir from which the sheet was drawn, had momentary surface contact with the glass at temperatures as high as 1500° F.

EXAMPLE II

The following composition represents another preferred embodiment of this invention in which a still higher proportion of the crocidolite blue asbestos is used:

|  | Percent by Weight | Percent of Total Asbestos Fiber Content |
|---|---|---|
| Chrysotile Asbestos, Canadian 4K | 20.2 | 25 |
| Crocidolite, South African Blue | 60.8 | 75 |
| Bentonite Clay (Montmorillonitic) | 4.0 | |
| Portland Cement, A.S.T.M. Type I | 15.0 | |
|  | 100.0 | |

A small amount of refiberized asbestos millboard scrap also may be included in the batch, of the same composition as the virgin materials.

When the above formula was converted into ¼ inch thick asbestos millboard in the regular wet machine production operation, cured for about 48 hours, dried and tested, the following results were obtained.

Density, unheated, lb. per cu. ft. _____ 70.1
Flexural strength (modulus of rupture), unheated, lb. per. sq. in. _____ 1497
Flexural strength, after heating 24 hrs. at 1200° F. _____ 754
Heat strinkage (caliper loss) after heating 24 hrs. at 1200° F. percent _____ 1.97
Recovery (resilience) after heating at 1200° F. and compressing under 1200 p.s.i., percent _____ 44.7

It is apparent that the above composition, containing 75% of the total fiber content as crocidolite and made to a higher density, produces a millboard having very high strength, very low heat shrinkage and even higher resilience (recovery after heating and compressing) than the composition of Example I.

EXAMPLE III

In this embodiment of the invention the entire asbestos fiber content of the millboard was of the crocidolite blue type.

|  | Percent by Weight | Percent of Total Asbestos Fiber Content |
|---|---|---|
| Crocidolite, South African Blue | 81.0 | 100 |
| Bentonite Clay (Montmorillonitic) | 4.0 | |
| Portland Cement, A.S.T.M. Type I | 15.0 | |
|  | 100.0 | |

When the above formula, not including any refiberized asbestos millboard scrap, was converted into the ¼ inch thick millboard, cured for about 48 hours, dried and tested, the following results were obtained.

Density, unheated, lb. per cu. ft. _____ 48.9
Flexural strength (modulus of rupture), unheated, lb. per sq. in. _____ 1060
Flexural strength, after heating 24 hrs. at 1200° F. _____ 480
Heat shrinkage (caliper loss) after heating 24 hrs. at 1200° F., percent _____ 0
Recovery (resilience) after heating at 1200° F. and compressing under 1200 p.s.i., percent _____ 26.1

The above test results show the amazing fact that the use of all crocidolite fiber in the asbestos millboard has not merely reduced the heat shrinkage at 1200° F., but has actually made the shrinkage zero so that even after this severe heat exposure the millboard shows no caliper loss. Although this millboard was made at rather low density, it still showed substantial resilience after heating at 1200° F. and compressing under a 1200 p.s.i. load. Also, the millboard had adequate strength to withstand handling, die cutting and fabricating stresses. For a given formulation of millboard, as the density is increased, both the flexural strength and the resilience also increase.

The improved asbestos millboard of this invention may be defined by the properties of very low heat shrinkage (caliper loss on heating 24 hours at 1200° F.) and by substantial resilience after heating to 1200° F. for 24 hours and compressing under a load of 1200 p.s.i.

The heat shrinkage should not exceed 4.0% of the original unheated caliper and preferably should be less than 3.0% of the original thickness. The resilience (recovery) after heating and compressing should be not less than 20% of the caliper reduction when compressed and preferably the recovery should exceed 25%.

To afford adequate strength for handling, die-cutting and installation stresses the millboard should have a flexural strength (unheated) not less than 800 lb. per sq. in. and to resist stresses in high temperature service it should have a flexural strength not less than 400 lb. per sq. in. after heat exposure to 1200° F. for 24 hours.

Flexural strength test

The flexural strength test is made on samples that have been conditioned in an oven at 212° F. for 4 hours. Specimens cut 3″ x 6″ both parallel to "machine direction" and "across machine direction" are tested on a 5 inch span, loading at midspan. The test results are calculated using the standard Modulus of Rupture formula:

$$3W \cdot L/2B \cdot D^2$$

where W is breaking load in pounds, L is span in inches, B is width of test specimen in inches, and D is thickness of specimen in inches. The average of the calculated results in the two directions is reported as flexural strength in pounds per square inch.

Heat shrinkage test

This test consists simply of exposing cut specimens of the asbestos millboard to a temperature of 1200° F. continuously for 24 hours in a thermostatically controlled oven or furnace. The bone-dry thickness of each millboard specimen is measured before it is heated and is measured again after it has been heated and then cooled to room temperature. The reduction in thickness (shrinkage) is measured and calculated as a percentage of the original (unheated) thickness.

Recovery (resilience) test

For the purpose of this invention this test is made on specimens that have been exposed to a temperature of 1200° F. continuously for 24 hours, as a method of measuring the heat resistance of the asbestos millboard. The test method is a modification of A.S.T.M. F 36–61T (Compressibility and Recovery of Gasket Materials) and consists of applying a load of 1200 p.s.i. with a suitably designed penetrator having a diameter of 0.252 in., measuring the thickness reduction under load after 60 seconds, removing the load and again measuring the thickness after 60 seconds to determine the recovery, which is expressed in percent of the thickness reduction under load.

Conventional asbestos millboard made with chrysotile fiber is produced having a rather wide range of density, from about 40 lb. to about 75.0 lb. per cubic foot, depending upon the use to which the millboard is to be put. The improved millboard of this invention can be produced in the same density range and will afford some of its special advantages even at low density. However, to obtain the optimum combination of properties—high flexural strength, minimum heat shrinkage, substantial resilience, good machineability, clean die-cutting, and high resistance to abrasion—the preferred density range of this invention is from about 50 lb. to 80.0 lb. per cu. ft.

As to the asbestos fiber and binder compositions from which the improved asbestos millboard of this invention can be produced considerable variation is possible. The total asbestos fiber content will be in the range of 60.0% to 93.0% by weight, but the preferred range for optimum properties of the millboard is in the range of 67.0% to 86.0% by weight. Thus, the total composite inorganic binder content will range from 40.0% to 7.0% broadly, with a preferred range of 33.0% to 14.0% by weight.

The composite inorganic binder includes both a self-setting hydraulic cement such as Portland cement and a plastic montmorillonitic clay such as bentonite. The broad range for these binder components is 5.0% to 30.0% of hydraulic cement and 2.0% to 10.0% of montmorillonitic clay, by weight, or in other words, from about 2.5 to 1 to about 3 to 1. Thus, in most cases the hydraulic cement will exceed in amount the clay content of the binder. The binder content of the preferred compositions ranges from 10.0% to 25.0% of hydraulic cement and from 4.0% to 8.0% of montmorillonitic clay. In these preferred composition ranges the hydraulic cement always exceeds the montmorillonitic clay in amount.

If the hydraulic cement is omitted or an insufficient amount is used in the millboard composition the product will lack hardness and have inadequate strength. If the montmorillonitic clay is omitted or an insufficient amount is used in the composition the effects on the millboard are reduced strength, reduced heat resistance and poor resilience after 1200° F. heat exposure and compression.

The hydraulic cement used as a component of the binder may be any of the standard Portland cements, including the several types listed in the A.S.T.M. Standard.

The montmorillonitic clay usually found most suitable in the binder composition is a high swelling natural bentonite clay, but various bentonites may be used including those that have been modified by heat treatment, by treatment with acids, salts or alkalies, or by ion exchange processes. The bentonite need not be the high swelling type although this gives preferred results. Part of the bentonite clay may be replaced by other finely divided plastic clays.

When chrysotile asbestos is used in the asbestos millboard of this invention it is selected from "paper making grades" of fiber in Groups 3 to 6 of the Fiber Classification System of the Quebec Asbestos Manufacturers Association. This system grades the fiber as to length by a screening test and is checked by a Canadian Government bureau as a quality control measure. Chrysotile asbestos produced in the United States and Canada is graded under this system so that a given grade designation represents a relatively uniform fiber.

Crocidolite and amosite asbestos are not produced under any standard grade system. However, these fibers can be screen tested in the same way as chrysotile using the Q.A.M.A. test equipment and the grade can thus be determined. When crocidolite or amosite asbestos is used in the improved asbestos millboard composition it is selected from fiber that when so tested is of "paper making grade" as to length.

To summarize the practical advantages afforded by the improved asbestos millboard of this invention when used for the fabrication of glass lehr rolls:

(1) Because heat shrinkage in service is much less and recovery from compression is greater, the pressure used to consolidate the discs in assembling the roll can be reduced. The reduced "lock up" pressure exerts less radial stress in the discs and results in less disruption and breakage of the roll in service.

(2) Since less shrinkage occurs in the thickness of the discs under continuous exposure to temperatures of 1200° F. the discs remain in tight relationship to each other and to the shaft on which they are assembled. As the metal of the shaft expands with heat the higher recovery from compression of the improved millboard enables the discs to maintain their tight relationship. This minimizes any tendency to disc breakage or surface disintegration that would cause surface blemishes in the plate glass.

From the above detailed disclosure of the invention, it is apparent that considerable variation in composition is possible while still affording its distinctive advantages and it is intended that the invention shall be limited only as set forth in the appended claims.

The embodiments of the invention in which an exclusive property or privilege is claimed are defined as follows:

1. An asbestos millboard composed of from about 60 percent to about 93 percent asbestos fibers bonded with from about 40 percent to about 7 percent of a heat resistant inorganic binder, said fibers including at least 30 percent by weight of the total fiber content of a tough, resilient amphibole asbestos of paper-making grade selected from the class consisting of crocidolite and amosite, the remainder of the fiber being chrysotile asbestos of paper making grade, said heat resistant binder being a composite mixture of a self-setting hydraulic cement and a plastic montmorillonitic clay in the proportion of from about 2.5 to 1 to about 3 to 1, said asbestos millboard being characterized by a very low heat shrinkage and by substantial resilience after being heated and compressed, whereby said millboard is enabled to endure continuous contact with sheet material having a surface temperature of 1200° F. for long periods of time without substantial structural deterioration of said millboard.

2. A product according to claim 1, wherein at least 30 percent by weight of the total fiber content is of crocidolite blue asbestos of paper-making grade.

3. A product according to claim 1, wherein the binder includes from 5 percent to 30 percent of self-setting hydraulic cement and from 2 percent to 10 percent of plastic montmorillonitic clay by weight of the millboard composition, said asbestos millboard being in the density range of 50 lbs. to 80 lbs. per cubic foot and being characterized by heat shrinkage in thickness not exceeding 4.0 percent after 24 hours' exposure to 1200° F. and by a flexural strength exceeding 400 lbs. per square inch after said 1200° F. heat exposure.

4. A product according to claim 1, wherein said fibers include crocidolite blue asbestos of paper-making grade in an amount of at least 50 percent by weight of the total fiber content, the remainder of said asbestos fiber being chrysotile asbestos of paper-making grade, said binder including from about 10 percent to about 25 percent of a self-setting hydraulic cement and about 4 percent to about 8 percent of a plastic montmorillonitic clay, both by weight of said asbestos millboard composition, said asbestos millboard being in the density range of 50 lbs. to 80 lbs. per cubic foot and being characterized by heat shrinkage after 24 hours' exposure at 1200° F. of less than 3.0 percent, and by a flexural strength after said 1200° F. heat exposure exceeding 400 pounds per square inch.

5. An asbestos millboard for fabrication of sheet glass drawing rolls composed of about 38 percent by weight of 4K grade chrysotile asbestos, about 38 percent by weight of crocidolite blue asbestos of paper-making grade, about 5 percent by weight of high swelling bentonite clay and about 19 percent by weight of A.S.T.M. Type I Portland cement, said asbestos millboard being characterized by a density of about 55.7 lbs. per cubic foot, by a flexural strength, unheated, of about 1115 lbs. per square inch, by a flexural strength after heating for 24 hours at 1200° F. of about 560 lbs. per square inch, by a heat shrinkage in thickness after heating for 24 hours at 1200° F. of about 2.82 percent and a recovery after heating for 24 hours at 1200° F. and compressing under a load of 1200 p.s.i. of about 40.9 percent, whereby said sheet glass drawing rolls are enabled to endure continuous contact with the sheet glass at surface temperatures up to 1200° F. for long periods of time without substantial structural deterioration of said rolls.

6. An asbestos millboard for fabrication of sheet glass drawing rolls composed of about 20 percent by weight of 4K grade chrysotile asbestos, about 60 percent by weight of crocidolite blue asbestos of paper-making grade, about 4 percent by weight of high swelling bentonite clay and about 15 percent by weight of A.S.T.M. Type I Portland cement, said asbestos millboard being characterized by a density of about 70.1 lbs. per cubic foot, by a flexural strength, unheated, of about 1497 lbs. per square inch, by a flexural strength after heating for 24 hours at 1200° F. of about 754 lbs. per square inch, by a heat shrinkage in thickness after heating for 24 hours at 1200° F. of about 1.97 percent and a recovery after heating for 24 hours at 1200° F. and compressing under a load of 1200 p.s.i. of about 44.7 percent, whereby said sheet glass drawing rolls are enabled to endure continuous contact with the sheet glass at surface temperatures up to 1200° F. for long periods of time without substantial structural deterioration of said rolls.

7. An asbestos millboard for fabrication of sheet glass drawing rolls composed of about 81 percent by weight of crocidolite blue asbestos of paper-making grade, about 4 percent by weight of high swelling bentonite clay and about 15 percent by weight of A.S.T.M. Type I Portland cement, said asbestos millboard being characterized by a density of about 48.9 lbs. per cubic foot, by a flexural strength, unheated, of about 1060 lbs. per square inch, by a flexural strength after heating 24 hours at 1200° F. of about 480 lbs. per square inch, by substantially zero heat shrinkage in thickness after heating 24 hours at 1200° F. and by a recovery after heating for 24 hours at 1200° F. and compressing under a load of 1200 p.s.i. of about 26.1 percent, whereby said sheet glass drawing rolls are enabled to endure continuous contact with the sheet glass at surface temperatures up to 1200° F. for long periods of time without substantial structural deterioration of said rolls.

8. An asbestos millboard composed of asbestos fibers bonded with a minor proportion of heat resistant inorganic binder, said fibers including at least about 50 percent by weight of the total fiber content of crocidolite blue asbestos of paper-making grade, the remainder of said fibers being chrysotile asbestos of paper-making grade, said asbestos fiber content being in the range of about 67 percent to about 86 percent by weight of the millboard composition, said heat resistant inorganic binder being in the range of about 33 percent to about 14 percent by weight of the millboard composition, said binder including from about 10 percent to about 25 percent of Portland cement and from about 4 percent to about 8 percent of high swelling bentonite clay by weight of the millboard composition, said asbestos millboard being characterized by a flexural strength exceeding 800 p.s.i., by a flexural strength after 24 hours' exposure to 1200° F. exceeding 400 p.s.i., by heat shrinkage and thickness after 24 hours' exposure to 1200° F. less than 3.0 percent and by recovery from compression under 1200 p.s.i after 24 hours' exposure to 1200° F. exceeding 25 percent of said compression, said asbestos millboard being in the density range of 50 to 80 lbs. per cubic foot.

References Cited

UNITED STATES PATENTS

| | | | |
|---|---|---|---|
| 2,421,721 | 6/1947 | Smith et al. | 106—99 X |
| 3,058,872 | 10/1962 | Feigley et al. | 162—181 X |
| 3,169,878 | 2/1965 | Snyder | 106—99 |
| 3,173,831 | 3/1965 | Pundsack et al. | 162—154 |
| 3,219,467 | 11/1965 | Redican et al. | 106—99 X |

S. LEON BASHORE, *Primary Examiner.*